Aug. 17, 1926.
T. C. KASEBERG
1,596,542
INSIDE AND OUTSIDE MICROMETER
Filed April 29, 1925    2 Sheets-Sheet 1
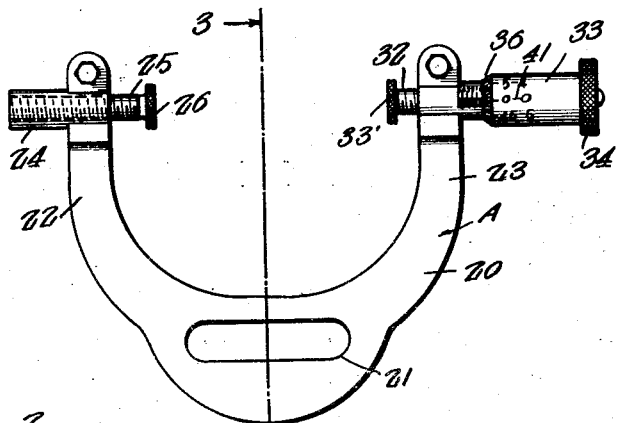
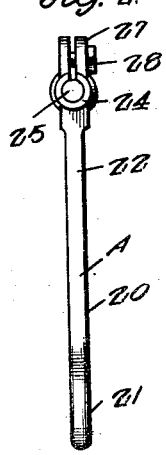
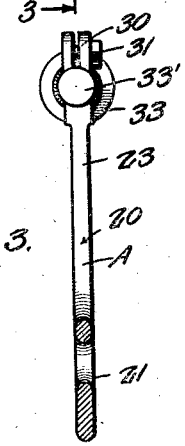
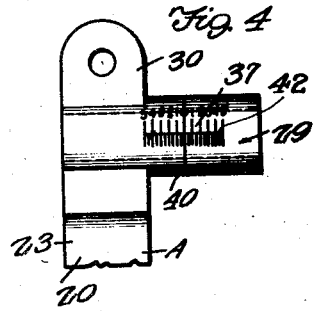
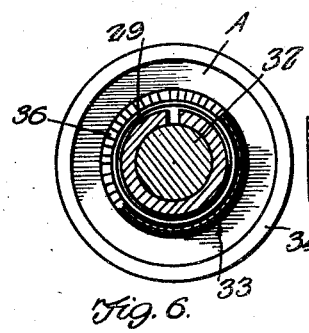
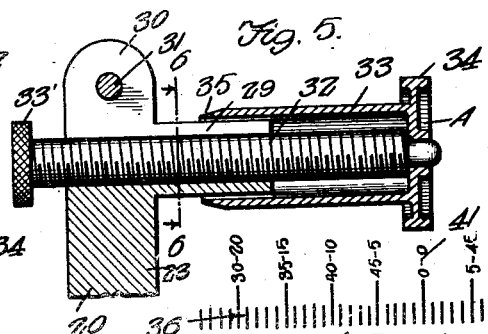
Theodore C. Kaseberg, Inventor
Witnesses
By Richard B. Owen
Attorney Aug. 17, 1926.  
T. C. KASEBERG  
1,596,542  
INSIDE AND OUTSIDE MICROMETER  
Filed April 29, 1925  
2 Sheets-Sheet 2
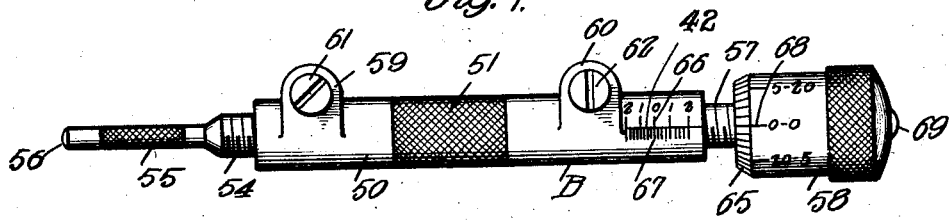
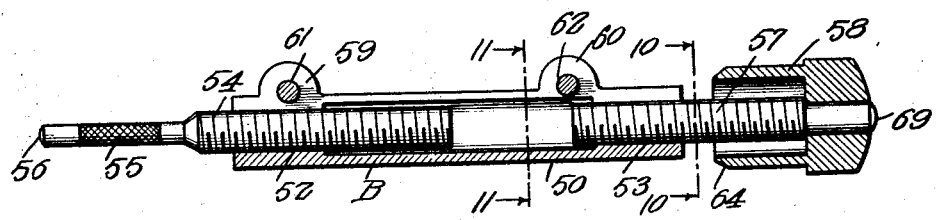
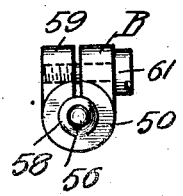 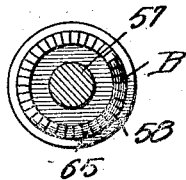 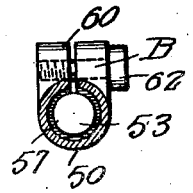
Theodore C. Kaseberg, Inventor
Witnesses
By Richard B. Owen
Attorney Patented Aug. 17, 1926.

1,596,542

UNITED STATES PATENT OFFICE.

THEODORE C. KASEBERG, OF GRANITE CITY, ILLINOIS.

INSIDE AND OUTSIDE MICROMETER.

Application filed April 29, 1925. Serial No. 26,767.

This invention appertains to a novel method and means for fitting car wheels on car axles and the primary object of the invention is to provide novel means for facilitating the accurate measuring of the axles and wheels by unskilled labor incident to the fitting of the wheels on their axles.

In the fitting of car wheels on axles it is necessary that the bores of the wheels be accurately made so as to be forced on the axles with a predetermined number of pounds pressure. To carry out this feature the axles are accurately measured with precision instruments and marked according to their sizes after which the wheels are bored to fit the various sized axles or after the wheels are made the bores thereof are measured and are fitted on the axles according to their size. The wheels and axles are generally measured by unskilled labor and considerable difficulty has been experienced in the successful use of precision instruments by such labor.

It is therefore the object of this invention to provide novel precision instruments which will stand up under rough handling and which can be readily used by unskilled workmen in an expeditious and satisfactory manner.

A further object of the invention is to provide an improved micrometer having graduations reading in either direction from a zero line, whereby, after adjustment of the micrometer in the usual way to the article to be measured, the reading of the micrometer will indicate at a glance the exact amount of undersize or oversize in the measurement of said article.

Another object of the invention is to provide a micrometer having wide contact faces for engaging the work, so that the same can be roughly handled and still be accurate in use.

A further object of the invention is the provision of a novel frame for the outside micrometer whereby the tool can be easily handled and gripped by the workmen with the minimum amount of danger on the part of the workmen.

A still further object of the invention is to provide an improved tool for car wheel and axle work which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is an elevation of the novel outside micrometer.

Figure 2 is an edge elevation of the same showing the anvil or stop screw end thereof, Figure 3 is a section through the micrometer taken on the line 3—3 of Figure 1 looking in the direction of the arrows, Figure 4 is an enlarged fragmentary section of one end of the micrometer showing the barrel and the graduations thereon, Figure 5 is an enlarged section through the barrel end of the micrometer.

Figure 6 is a detail section taken on the line 6—6 of Figure 5 looking in the direction of the arrows, Figure 7 is a side elevation of the novel inside micrometer, Figure 8 is a longitudinal section through the same, Figure 9 is an end elevation of the inside micrometer showing the set screw end thereof, Figure 10 is a section through the inside micrometer taken on the line 10—10 of Figure 8 looking in the direction of the arrows, Figure 11 is a section through the inside micrometer taken on the line 11—11 of Figure 8 looking in the direction of the arrows, Figure 12 is a diagrammatic view showing the graduations for the thimble or hand screw head of the inside micrometer developed, Figure 13 is a diagrammatic view showing the graduations of the thimble or hand screw head of the outside micrometer developed.

Referring to the drawings in detail, wherein similar reference characters designate corresponding parts throughout the several views, the letter A generally indicates the improved outside micrometer used for measuring the car axles, and B the inside micrometer for measuring the bores of the car wheels.

The outside micrometer A comprises the U-shaped frame 20 having formed thereon the hand grip 21 at the connecting portions thereof to permit the easy handling of the tool. The frame 20 includes substantially parallel arms 22 and 23 and the outer end of the arm 22 has formed thereon the split internally threaded sleeve 24 for the reception of the stop screw or anvil 25. This stop screw or anvil 25 is provided with an enlarged flat work engaging head 26 and the outer edge of the head 26 can be knurled to permit the easy manipulation of the screw. Ears 27 are formed on the sleeve 24 and the ears are adapted to receive a set screw 28, by means of which the sleeve can be pressed for binding engagement with the screw, after the same has been initially set to the desired position, as will be hereinafter more fully described.

The outer end of the arm 23 is provided with the split internally threaded barrel 29 and the barrel on each side of the split portion thereof is provided with ears 30 for the reception of the set screw 31. The bore of the barrel 29 is provided with a predetermined number of threads per inch. The barrel 29 has threaded into the same the head screw 32, the inner end of which is provided with an enlarged work engaging head 33' which is of substantially the same shape and size as the head 26 of the stop screw or anvil 25. Rigidly secured to the outer end of the head screw is the thimble or hand screw head 33 and this thimble is of such a size as to snugly receive the barrel 29. The outer end of the thimble or head 33 is provided with a circular knurled enlargement 34 for permitting convenient rotation of the thimble and head screw. The inner end of the thimble is tapered as at 35 and provided with graduations 36 for cooperation with the graduations 37 on the barrel 29. The barrel 29 is graduated from a central zero point designated by the character 40 on each side thereof as clearly shown in Figure 4 of the drawings. The graduations 36 on the thimble 33 are provided with a zero line indicated by the reference character 41 and the graduations are marked so as to permit the reading thereof on each side of the zero mark according to whether the work is over or under size. A line 42 extends longitudinally of the barrel 29, and from this line the graduations 36 on the thimble are to be read. This line is so positioned that when the inner edge of the thimble is flush with the zero line 40, the zero line 41 on the thimble will coincide with the reading line 42.

The inside micrometer B includes a split barrel 50 which is preferably knurled at a point intermediate its ends as indicated by the reference character 51. The opposite terminals of the barrel 50 are reduced in diameter and provided respectively with the threads 52 and 53 and threaded in the barrel is the set screw 54, the outer end of which is reduced and knurled, as at 55. The extreme outer end of the set screw is provided with a work engaging face 56. The opposite end of the barrel has threaded into the same the head screw 57 to which is rigidly secured the thimble or head 58 and the head is adapted to snugly receive the barrel, when the screw is threaded into the same. The barrel on each side of the split portion thereof adjacent to the set screw 54 and the head screw 53 is provided with pairs of ears 59 and 60 respectively and these pairs of ears are adapted to receive set screws 61 and 62 respectively. It is obvious that when the screw 61 is tightened, that the set screw will be firmly clamped in place. The inner edge of the thimble or head 58 is tapered as at 64 and provided with graduations 65 which are adapted to cooperate with graduations 66 on the barrel. The graduations 66 are provided with a central zero line indicated by the reference character 67 and the barrel is marked so as to permit the reading thereof on each side of the zero mark. The graduations 65 is also provided with a zero mark indicated by the reference character 68 and is provided with suitable figures so as to permit the reading thereof from each side of the zero mark according to whether the mark is over or under size.

The thimble or head in its axial center is provided with a work engaging face 69.

In use of the improved device, to fit a pair of wheels on an axle having five and a half inch by ten-inch journal, which is the size for a fifty ton capacity car, the diameter of the wheel seat of the axle would be seven inch standard, but the bore of the wheel would be six and nine hundred and eighty five thousandths of an inch in order to make the proper fit. In order to simplify the measurement and to do away with all figuring, reference gages for the inside micrometer are provided one which is fifteen thousandths of an inch small for fifty ton capacity car axles, another thirteen thousandths of an inch small for forty ton capacity car axles and another twelve thousandths of an inch small for a thirty ton capacity car axles. The micrometer is set at the zero point during the initial fitting thereof so that when a wheel is bored that fits the micrometer at the zero point it is marked O. K. and will take the required pressure to mount it on a standard axle. In initially setting the inside micrometer the thimble or head 58 is moved to zero and the working faces thereof are placed between the proper faces of the desired reference gage and the set screw 54 is turned until the working faces of the micrometer snugly engage the faces of the gage after which the screw 61 is tightened, so as to prevent the accidental turning of the set screw. The gage is now ready for use. If a bore is five thousandths of an inch large it is marked 5-L by the workman and will fit an axle that is five thousandths of an inch large. If the bore is five thousandths or ten thousandths of an inch small it will fit an axle that is five thousandths or ten thousandths of an inch small and would be marked 5-S or 10-S. A wheel marked O. K. will fit an axle marked O. K. or one marked 6-S would fit an axle marked 6-S or six thousandths small.

In turning new axles it is preferred to turn as close to size as possible, but as a general rule there is a variation of from six thousandths of an inch small to six thousandths of an inch large. The axles are gaged up with the micrometer A and marked similar to the wheels such as 6-S, 3-S, O. K. 3-L, 6-L or whatever they may be.

The boring tools used in most all the railroad shops in the country are adjustable and graduated in one thousandths of an inch. The tools would be set to bore wheels of different sizes, say some six thousandths of an inch small, some three thousandths of an inch small, O. K., three thousandths of an inch large, six thousandths of an inch large, to take care of any size axles which would be turned.

The outside micrometer is initially set similar to the inside micrometer and the thimble or head 33 is turned to zero in setting and placed on a suitable gage at the desired portion thereof after which the stop screw is turned until the large working faces thereof snugly engage the gage after which the set screw 28 is tightened so as to prevent the accidental rotation of the screw.

The micrometers are strong and will stand all the abuse given and are set so that all the workmen have to do is to turn the head or thimble one way or the other until the fit is made either on the inside of the bore with the inside micrometer or on the outside diameter of the axle with the outside micrometer. With a glance, it can be seen on which side of the zero line the inner end of the thimble is positioned and whether it indicates a measurement five thousandths of an inch, ten thousandths of an inch, or fifteen thousandths of an inch small or five thousandths of an inch, ten thousandths of an inch or twenty five thousandths of an inch large as it may be.

Changes in details may be made without departing from the spirit or scope of the invention, but:—

What I claim as new is:

1. A micrometer having a barrel provided with graduations reading from the left and right of a zero line, and adjusting mechanism comprising a member co-operating with said barrel in the adjustment of the micrometer in functional relation with the graduations on said barrel.

2. A micrometer having a barrel provided with graduations reading from the left and right of a zero line and having a reading line, in combination with adjusting mechanism including a member having graduations thereon reading from the left and right of a zero line and having functional relation with the graduations and reading line on said barrel in the adjustment of the micrometer.

3. In a micrometer, a barrel having a central zero line thereon, there being graduations on the barrel reading from the right and left of said zero line, a head-screw fitted in the barrel, and a thimble for the head-screw provided with a zero line and graduations for co-operation with the zero line and graduations on the barrel, said graduations on the thimble also reading from the right and left of the zero line thereon.

4. In a micrometer, a body provided with graduations reading from the left and right of a central zero line, a head-screw, a thimble for the head-screw provided with graduations for co-operating with the graduations on the body and also reading to the left and right of a central zero line, and an adjustable stop screw provided in the body for varying the distance between its operative end and that of said head-screw for facilitating the initial setting of the micrometer.

5. In a micrometer, a body, a head screw carried by the body, there being graduations on the body provided with a central zero mark and reading from the right and left thereof, a thimble for the head screw provided with graduations having a zero line reading from the opposite sides thereof for cooperation with the graduations on the body, and a hand screw adjustably carried by the opposite end of the body to permit the thimble to set at zero according to the standard size of the work to be measured, and means for gripping the hand screw to prevent the accidental rotation thereof after the initial setting of the micrometer.

6. An outside micrometer comprising a U-shaped frame having substantially parallel legs, a barrel carried by one of the legs provided with an internally threaded bore, a head screw threaded in said bore of the barrel, there being graduations on the barrel provided with a central zero line, the graduations reading from the right and left of said zero line, a thimble receiving the barrel rigidly secured to the head screw provided with graduations having a zero line, the graduations reading to the right and left thereof, a slit sleeve carried by the other leg of the frame disposed in longitudinal alinement with the barrel, the slit sleeve being provided with internal threads, a stop screw threaded in said sleeve, lugs formed on the sleeve on opposite sides of the split portion thereof and a set screw extending through said ears.

7. An outside micrometer comprising a U-shaped frame including substantially parallel legs and a connecting portion, a barrel carried by the outer terminal of one leg provided with internal threads, a head screw fitted in the barrel, the barrel being provided with graduations reading to the right and left central zero line, a thimble receiving the barrel secured to the head screw provided with graduations reading to the right and left of the zero point for cooperation with the graduations on the barrel, a split sleeve carried by the outer end of the other legs disposed in longitudinal alinement with the barrel and provided with internal threads, a stop screw threaded into the split sleeve, ears carried by the sleeve arranged on opposite sides of the split portion thereof, a set screw threaded through the ears, enlarged work engaging faces formed on the inner end of the head and stop screws, and a handle formed on the connecting portion of the frame.

In testimony whereof I affix my signature.

THEODORE C. KASEBERG.